United States Patent
Grab et al.

(10) Patent No.: US 12,355,736 B2
(45) Date of Patent: *Jul. 8, 2025

(54) SYSTEMS AND METHODS FOR APPLICATION IDENTIFICATION

(71) Applicant: DIVX, LLC, San Diego, CA (US)

(72) Inventors: Eric William Grab, San Diego, CA (US); Kourosh Soroushian, San Diego, CA (US); Tung Lin, San Diego, CA (US); Francis Yee-Dug Chan, San Diego, CA (US); Evan Wallin, San Diego, CA (US); William David Amidei, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,982

(22) Filed: Dec. 1, 2023

(65) Prior Publication Data

US 2024/0356903 A1    Oct. 24, 2024

Related U.S. Application Data

(63) Continuation of application No. 17/456,842, filed on Nov. 29, 2021, now Pat. No. 11,870,758, which is a (Continued)

(51) Int. Cl.
*H04L 9/40* (2022.01)
*G06F 21/10* (2013.01)
(Continued)

(52) U.S. Cl.
CPC .......... *H04L 63/0428* (2013.01); *G06F 21/10* (2013.01); *G06F 21/12* (2013.01);
(Continued)

(58) Field of Classification Search
CPC . H04L 63/0428; H04L 63/06; H04L 63/0876; H04L 63/0884; H04L 63/168; H04L 67/60; G06F 21/10; G06F 21/12
See application file for complete search history.

(56) References Cited

U.S. PATENT DOCUMENTS 5,400,401 A    3/1995  Wasilewski et al.
5,574,785 A    11/1996 Ueno et al.
(Continued)

FOREIGN PATENT DOCUMENTS

CA    2237293 A1    7/1997
EP    1453319 A1    9/2004
(Continued)

OTHER PUBLICATIONS

Information Technology—MPEG Systems Technologies—Part 7: Common Encryption in ISO Base Media File Format Files (ISO/IEC 23001-7), Apr. 2015, 24 pgs.
(Continued)

*Primary Examiner* — Abiy Getachew
(74) *Attorney, Agent, or Firm* — KPPB LLP

(57) ABSTRACT

Systems and methods for application identification in accordance with embodiments of the invention are disclosed. In one embodiment, a user device includes a processor and memory configured to store an application, a session manager, an application identifier, and at least one shared library, and the processor is configured by the session manager to communicate the application identifier and the application identifier data to an authentication server and permit the execution of the application in response to authentication of the application by the authentication server.

12 Claims, 7 Drawing Sheets

Related U.S. Application Data continuation of application No. 16/457,255, filed on Jun. 28, 2019, now Pat. No. 11,190,497, which is a continuation of application No. 15/682,453, filed on Aug. 21, 2017, now Pat. No. 10,341,306, which is a continuation of application No. 15/018,721, filed on Feb. 8, 2016, now Pat. No. 9,794,233, which is a continuation of application No. 14/451,299, filed on Aug. 4, 2014, now Pat. No. 9,268,923, which is a continuation of application No. 13/340,594, filed on Dec. 29, 2011, now Pat. No. 8,799,647.

(60) Provisional application No. 61/529,876, filed on Aug. 31, 2011.

(51) Int. Cl.
  *G06F 21/12* (2013.01)
  *H04L 67/60* (2022.01)

(52) U.S. Cl.
  CPC .......... *H04L 63/06* (2013.01); *H04L 63/0876* (2013.01); *H04L 63/0884* (2013.01); *H04L 63/168* (2013.01); *H04L 67/60* (2022.05)

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,673,316 A | 9/1997 | Auerbach et al. |
| 5,734,823 A | 3/1998 | Chang et al. |
| 5,805,700 A | 9/1998 | Nardone et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 5,970,147 A | 10/1999 | Davis |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,834,269 B1 | 12/2004 | Bueche |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,127,713 B2 | 10/2006 | Davis |
| 7,151,832 B1 | 12/2006 | Fetkovich et al. |
| 7,188,183 B1 | 3/2007 | Paul et al. |
| 7,212,726 B2 | 5/2007 | Zetts |
| 7,242,772 B1 | 7/2007 | Tehranchi |
| 7,243,346 B1 | 7/2007 | Seth et al. |
| 7,274,861 B2 | 9/2007 | Yahata et al. |
| 7,286,651 B1 | 10/2007 | Packingham et al. |
| 7,295,673 B2 | 11/2007 | Grab et al. |
| 7,349,886 B2 | 3/2008 | Morten et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,454,780 B2 | 11/2008 | Katsube et al. |
| 7,457,415 B2 | 11/2008 | Reitmeier et al. |
| 7,460,688 B2 | 12/2008 | Stanback et al. |
| 7,499,930 B2 | 3/2009 | Naka et al. |
| 7,515,710 B2 | 4/2009 | Russell et al. |
| 7,519,274 B2 | 4/2009 | Li |
| 7,546,641 B2 | 6/2009 | Robert et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,853,980 B2 | 12/2010 | Pedlow, Jr. et al. |
| 7,864,186 B2 | 1/2011 | Robotham et al. |
| 7,878,907 B2 | 2/2011 | Davis et al. |
| 7,882,034 B2 | 2/2011 | Hug et al. |
| 7,945,143 B2 | 5/2011 | Yahata et al. |
| 7,975,312 B2 | 7/2011 | Broderson et al. |
| 8,082,442 B2 | 12/2011 | Keljo et al. |
| 8,091,084 B1 | 1/2012 | Dobrovolskiy |
| 8,131,875 B1 | 3/2012 | Chen |
| 8,169,916 B1 | 5/2012 | Pai et al. |
| 8,195,714 B2 | 6/2012 | Mckibben et al. |
| 8,243,924 B2 | 8/2012 | Chen et al. |
| 8,286,213 B2 | 10/2012 | Seo |
| 8,312,079 B2 | 11/2012 | Newsome et al. |
| 8,341,715 B2 | 12/2012 | Sherkin et al. |
| 8,369,421 B2 | 2/2013 | Kadono et al. |
| 8,649,669 B2 | 2/2014 | Braness et al. |
| 8,683,066 B2 | 3/2014 | Hurst et al. |
| 8,782,268 B2 | 7/2014 | Pyle et al. |
| 8,799,647 B2 | 8/2014 | Grab et al. |
| 8,819,116 B1 | 8/2014 | Tomay et al. |
| 8,849,950 B2 | 9/2014 | Stockhammer et al. |
| 9,038,116 B1 | 5/2015 | Knox et al. |
| 9,092,646 B2 | 7/2015 | Grab et al. |
| 9,094,379 B1 | 7/2015 | Miller |
| 9,253,178 B2 | 2/2016 | Blom et al. |
| 9,268,923 B2 | 2/2016 | Grab et al. |
| 9,794,233 B2 | 10/2017 | Grab et al. |
| 10,341,306 B2 | 7/2019 | Grab et al. |
| 11,190,497 B2 | 11/2021 | Grab et al. |
| 11,870,758 B2 | 1/2024 | Grab et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0150243 A1 | 10/2002 | Craft et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0118974 A1 | 6/2003 | Obrador |
| 2003/0135742 A1 | 7/2003 | Evans |
| 2003/0142594 A1 | 7/2003 | Tsumagari et al. |
| 2003/0145222 A1 | 7/2003 | Gittler et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |

(56) References Cited

U.S. PATENT DOCUMENTS

| | | |
|---|---|---|
| 2004/0047607 A1 | 3/2004 | Seo et al. |
| 2004/0076237 A1 | 4/2004 | Kadono et al. |
| 2004/0081333 A1 | 4/2004 | Grab et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2004/0117306 A1 | 6/2004 | Karaoguz et al. |
| 2004/0268152 A1 | 12/2004 | Xia et al. |
| 2005/0013494 A1 | 1/2005 | Srinivasan et al. |
| 2005/0063541 A1 | 3/2005 | Candelore |
| 2005/0066303 A1 | 3/2005 | Rochette et al. |
| 2005/0076232 A1 | 4/2005 | Kawaguchi |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0013568 A1 | 1/2006 | Rodriguez |
| 2006/0015580 A1 | 1/2006 | Gabriel et al. |
| 2006/0020825 A1 | 1/2006 | Grab |
| 2006/0165163 A1 | 7/2006 | Burazerovic et al. |
| 2006/0218536 A1 | 9/2006 | Kirilline et al. |
| 2006/0224513 A1 | 10/2006 | Kawamoto et al. |
| 2006/0235956 A1 | 10/2006 | Kawaguchi et al. |
| 2007/0033419 A1 | 2/2007 | Kocher et al. |
| 2007/0047645 A1 | 3/2007 | Takashima |
| 2007/0064936 A1 | 3/2007 | Kasahara et al. |
| 2007/0067472 A1 | 3/2007 | Maertens et al. |
| 2007/0083467 A1 | 4/2007 | Lindahl et al. |
| 2007/0180051 A1 | 8/2007 | Kelly et al. |
| 2007/0180450 A1 | 8/2007 | Croft et al. |
| 2007/0198414 A1 | 8/2007 | Derrenberger |
| 2007/0250632 A1 | 10/2007 | Nomura et al. |
| 2008/0077592 A1 | 3/2008 | Brodie et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0172341 A1 | 7/2008 | Crandell |
| 2008/0178298 A1* | 7/2008 | Arai ............... H04L 67/5682 726/29 |
| 2008/0201705 A1 | 8/2008 | Wookey |
| 2009/0010622 A1 | 1/2009 | Yahata et al. |
| 2009/0013195 A1 | 1/2009 | Ochi et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0165148 A1 | 6/2009 | Frey et al. |
| 2009/0178090 A1 | 7/2009 | Oztaskent |
| 2009/0205037 A1 | 8/2009 | Asakura |
| 2009/0235070 A1 | 9/2009 | Trench |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0011446 A1 | 1/2010 | Klucher et al. |
| 2010/0142915 A1* | 6/2010 | McDermott ....... H04N 21/4722 386/343 |
| 2010/0247059 A1 | 9/2010 | Lee et al. |
| 2010/0262958 A1 | 10/2010 | Clinton et al. |
| 2010/0325150 A1 | 12/2010 | Mordetsky et al. |
| 2011/0010466 A1 | 1/2011 | Fan et al. |
| 2011/0058675 A1 | 3/2011 | Brueck et al. |
| 2011/0096828 A1 | 4/2011 | Chen et al. |
| 2011/0103374 A1 | 5/2011 | Lajoie et al. |
| 2011/0135090 A1 | 6/2011 | Chan et al. |
| 2011/0145562 A1 | 6/2011 | Mangalore |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0185355 A1 | 7/2011 | Chawla et al. |
| 2011/0197261 A1 | 8/2011 | Dong et al. |
| 2011/0197267 A1 | 8/2011 | Gravel et al. |
| 2011/0202903 A1 | 8/2011 | Lee et al. |
| 2011/0211808 A1* | 9/2011 | Ryu ................... H04N 21/4825 386/234 |
| 2011/0246661 A1 | 10/2011 | Manzari et al. |
| 2011/0258623 A1* | 10/2011 | Wagner ............. H04N 21/4828 718/1 |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0066509 A1 | 3/2012 | Lapp et al. |
| 2012/0110120 A1 | 5/2012 | Willig et al. |
| 2012/0167132 A1 | 6/2012 | Mathews et al. |
| 2012/0311174 A1 | 12/2012 | Bichot et al. |
| 2012/0331167 A1 | 12/2012 | Hunt |
| 2013/0006869 A1 | 1/2013 | Grab et al. |
| 2013/0007443 A1 | 1/2013 | Grab et al. |
| 2013/0007467 A1 | 1/2013 | Chan et al. |
| 2013/0013803 A1 | 1/2013 | Bichot et al. |
| 2013/0054960 A1 | 2/2013 | Grab et al. |
| 2013/0055255 A1 | 2/2013 | Wagner et al. |
| 2013/0080267 A1 | 3/2013 | McGowan |
| 2014/0140253 A1 | 5/2014 | Lohmar et al. |
| 2014/0149557 A1 | 5/2014 | Lohmar et al. |
| 2014/0195807 A1 | 7/2014 | Bar-el et al. |
| 2014/0351574 A1 | 11/2014 | Grab |
| 2015/0181301 A1* | 6/2015 | Bloch ................ H04N 21/4532 725/41 |
| 2015/0288530 A1 | 10/2015 | Oyman |
| 2016/0156602 A1 | 6/2016 | Grab et al. |
| 2017/0374039 A1 | 12/2017 | Grab et al. |
| 2019/0319935 A1 | 10/2019 | Grab et al. |
| 2020/0233981 A1 | 7/2020 | Grab et al. |
| 2022/0263807 A1 | 8/2022 | Grab et al. |

FOREIGN PATENT DOCUMENTS

| | | |
|---|---|---|
| EP | 1283640 B1 | 10/2006 |
| EP | 2180664 A1 | 4/2010 |
| EP | 2360923 A1 | 8/2011 |
| KR | 20040039852 A | 5/2004 |
| KR | 20060106250 A | 10/2006 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2013003611 A2 | 1/2013 |
| WO | 2013032513 A2 | 3/2013 |
| WO | 2013032515 A2 | 3/2013 |
| WO | 2013032515 A3 | 5/2013 |

OTHER PUBLICATIONS

International Preliminary Report on Patentability for International Application No. PCT/US2011/068048, Report Issued Mar. 4, 2014, 8 pgs.

International Preliminary Report on Patentability for International Application No. PCT/US2012/044680, International Filing Date Jun. 28, 2012, Mailed Apr. 1, 2014, 11 pgs.

International Preliminary Report on Patentability for International Application PCT/US2011/064677, issued Mar. 4, 2014, 5 pgs.

International Search Report and Written Opinion for International Application No. PCT/US2011/064677, International Filing Date Dec. 13, 2011, Search Completed Mar. 28, 2012, Mailed Apr. 10, 2012, 6 pgs.

International Search Report and Written Opinion for International Application No. PCT/US2011/068048, Search Completed Feb. 14, 2013, Mailed Mar. 14, 2013, 8 Pages.

International Search Report and Written Opinion for International Application No. PCT/US2012/44680, International Filing Date Jun.

(56) References Cited

OTHER PUBLICATIONS 28, 2012, Search Completed Aug. 29, 2012, Mailed Sep. 18, 2012, 12 pgs.
ISO/IEC 14496-12 Information technology—Coding of audiovisual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology-Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M., "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.

Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, File Wrapper, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Huang, File Wrapper, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.
Jain et al., File Wrapper, U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.

(56) References Cited

OTHER PUBLICATIONS

Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, pp. 325-344.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, File Wrapper, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Peek, David, "Consumer Distributed File Systems", Dissertation, Doctor of Philosophy, Computer Science and Engineering, The University of Michigan, 2009, 118 pgs.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., File Wrapper, U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

\* cited by examiner

*FIG. 3*

Application Database Tables — 74

| Application ID | Application Name | Application Version | Vendor | Product ID |
|---|---|---|---|---|
| A123456789 | DVD Streaming Client | 1.1 | Vendor A | P111 |
| A234567890 | Web Streaming Client | 1.1 | Vendor B | P112 |
| A345678901 | Web Streaming Client | 1.2 | Vendor B | * |

| Product ID |
|---|
| P113 |
| P114 |
| P115 |

76, 78, 80, 82

SYSTEMS AND METHODS FOR APPLICATION IDENTIFICATION

CROSS-REFERENCE TO RELATED APPLICATIONS

The current application is a continuation of U.S. patent application Ser. No. 17/456,842, entitled "Systems and Methods for Application Identification", filed Nov. 29, 2021 and issued as U.S. Pat. No. 11,870,758 on Jan. 9, 2024, which is a continuation of U.S. patent application Ser. No. 16/457,255, entitled "Systems and Methods for Application Identification", filed Jun. 28, 2019 and issued as U.S. Pat. No. 11,190,497 on Nov. 30, 2021, which is a continuation of U.S. patent application Ser. No. 15/682,453, entitled "Systems and Methods for Application Identification", filed Aug. 21, 2017 and issued as U.S. Pat. No. 10,341,306 on Jul. 2, 2019, which is a continuation of U.S. patent application Ser. No. 15/018,721, entitled "Systems and Methods for Application Identification", filed Feb. 8, 2016 and issued as U.S. Pat. No. 9,794,233 on Oct. 17, 2017, which is a continuation of U.S. patent application Ser. No. 14/451,299, entitled "Systems and Methods for Application Identification", filed Aug. 4, 2014 and issued as U.S. Pat. No. 9,268,923 on Feb. 23, 2016, which is a continuation of U.S. patent application Ser. No. 13/340,594, entitled "Systems and Methods for Application Identification", filed Dec. 29, 2011 and issued as U.S. Pat. No. 8,799,647 on Aug. 5, 2014, which claims priority to U.S. Provisional Application Ser. No. 61/529,876, filed Aug. 31, 2011, entitled "Systems and Methods for Application Identification," the disclosures of which are incorporated herein by reference.

FIELD OF THE INVENTION

The present invention relates to cross-platform software applications and more specifically to the identification of cross-platform software applications.

BACKGROUND OF THE INVENTION

Consumer electronic (CE) devices are typically proprietary platforms. CE devices are generally resource limited user devices with limited memory and processing power. CE devices can be contrasted with devices endowed with sufficient resources for a range of functions that can be resource intensive, such as a personal computer. A CE device, such as a mobile phone or Internet television, typically requires a significant investment to create and maintain. Additionally, a CE device may include security features, such as proprietary access information for CE device updates and other services from CE device creators or managers.

CE devices can utilize applications to make a device more useful. An application is software that performs a specific task for a user. This is in contrast to software, which integrates a device's capabilities, such as an operating system. Many applications on CE devices are natively implemented. The term "natively implemented" is typically used to describe an application that is specifically designed to run on a device platform, such as a device's operating system and machine firmware. A natively implemented application typically needs to be ported, or adapted, for each different device on which it is implemented.

SUMMARY OF THE INVENTION

Systems and methods for application identification in accordance with embodiments of the invention are disclosed. In one embodiment, a user device includes a processor and memory configured to store an application, a session manager,
an application identifier, and at least one shared library, and the processor is configured by the session manager to communicate the application identifier and the application identifier data to an authentication server and permit the execution of the application in response to authentication of the application by the authentication server.

In a further embodiment, the session manager is statically compiled into the application.

In another embodiment, the session manager and the stored libraries are part of a common application platform stored in the memory of the user device.

In a still further embodiment, the application identifier is contained in encrypted provisioning data stored in the memory, where the provisioning data is encrypted so that its content is not accessible to the user device.

In still another embodiment, the provisioning data is encrypted with cryptographic information associated with the application identifier.

In a yet further embodiment, the encrypted provisioning data is embedded in the application.

In yet another embodiment, the session manager also configures the processor to generate application identifier data based upon at least one characteristic of the application and communicate the application identifier data to the authentication server.

In a further embodiment again, the application includes at least one file and the application identifier data includes information that can be used to authenticate the at least one file.

In another embodiment again, the information that can be used to authenticate the at least one file includes at least one hash of at least a part of at least one of the at least one files.

In a further additional embodiment, the application identifier data includes at least one piece of data selected from the group consisting of: application name, application version, and application vendor.

Another additional embodiment also includes a product identifier stored in memory, where the product identifier is associated with the execution platform of the user device.

In a still yet further embodiment, the memory is further configured to store a library manifest containing information that can be used to authenticate at least one shared library and the processor is further configured by a session manager to receive a request to access a target library from the at least one shared library, authenticate the target library using the library manifest, permit the application to access the target library, when the library is authenticated, and deny the application access to the target library, when the library does not authenticate.

In still yet another embodiment, the library manifest contains at least one private key signature.

In a still further embodiment again, the library manifest contains a private key signature of the contents of the manifest.

In still another embodiment again, the library manifest contains at least one hash of the target library.

In a still further additional embodiment, the library manifest is encrypted with a manifest key.

In still another additional embodiment, the processor is further configured by the session manager to negotiate a session token key with the target library and provide a session token encrypted with the session token key to the application, where the session token key grants access to the target library.

In a yet further embodiment again, configuring the processor to negotiate a session token key with the shared library also includes the session manager configuring the processor to send a request to the target library, receive data encrypted with a session manager public key, send data encrypted with a shared library public key to the target library, and receive a confirmation.

Yet another embodiment again also includes at least one application identifier stored in memory that is associated with a shared library.

In a yet further additional embodiment, authenticating an application executing on a user device configured to communicate with an authentication server includes retrieving encrypted provisioning data containing an application ID associated with an application using a user device, sending the encrypted provisioning data to an authentication server using the user device, receiving authentication of the application from the authentication server, and authorizing the execution of the application.

In yet another additional embodiment, the provisioning data is encrypted with a provisioning data key and the authentication server holds the provisioning data key.

A further additional embodiment again also includes sending information describing the application to the authentication server using the user device and receiving confirmation from the authentication server that the information matches information stored on the authentication server that is associated with the application using the user device.

Another additional embodiment again also includes forcing an update of the application using the authentication server and the information describing the application includes an application version.

A still yet further embodiment again also includes retrieving a product identifier that identifies a type of user device using the user device, sending the product identifier that identifies the type of user device to the authentication server with the encrypted provisioning data, and receiving confirmation from the authentication server that the application is compatible with the user device.

Still yet another embodiment again also includes receiving a request from the application to access a shared library on the user device, retrieving an application identifier that identifies the shared library, sending the application identifier that identifies the shared library to the authentication server with the encrypted provisioning data, and receiving confirmation from the authentication server that the application is compatible with the shared library.

In a still yet further additional embodiment, providing an application with access to a shared library on a user device includes receiving a request for access to a shared library on a user device, verifying provisioning data stored on the user device containing an application identifier, verifying the shared library stored on the user device using a library manifest containing information that can be used to identify and verify the shared library, negotiating a session token key with the shared library using the user device, and providing a session token encrypted with the session token key to the application using the user device, where the session token key grants access to the shared library.

In still yet another additional embodiment, the request for access to a shared library received by the user device includes provisioning data and the name of the shared library.

In a yet further additional embodiment again, verifying the provisioning data includes sending the provisioning data to an authentication server and receiving confirmation from the authentication server.

In yet another additional embodiment again, the library manifest contains at least one private key signature.

In a still yet further additional embodiment again, the library manifest contains at least one hash of the shared library.

In still yet another additional embodiment again, the library manifest contains a private key signature of the contents of the manifest.

In another further embodiment, the library manifest is encrypted with a manifest key.

In still another further embodiment, negotiating a session token key includes sending a request to the shared library using the user device, receiving data encrypted with the session manager's public key using the user device, sending data encrypted with the shared library's public key to the shared library using the user device, and receiving confirmation from the share library using the user device.

In yet another further embodiment, an authentication server includes a processor and memory configured to store at least one application identifier, where the application identifier is associated with a specific application and with application identifier data, and the processor is configured by an authentication application to receive application identifier data and encrypted provisioning data containing an application identifier from a user device, extract the application identifier from the encrypted provisioning data, retrieve stored application identifier data associated with the extracted application identifier, compare at least a portion of the stored application identifier data with the received application identifier data, and send a message authenticating the application to a user device, when the compared portions of application identifier data match.

In another further embodiment again, the memory is also configured to store cryptographic information associated with the application identifier and the processor is configured to access the application identifier within the encrypted provisioning data using the cryptographic information associated with the application identifier.

In a further embodiment, the application includes at least one file and the application identifier data includes information that can be used to authenticate at least one of the files.

In another embodiment, the information that can be used to authenticate at least one of the files includes hashes of part or all of the files.

In a still further embodiment, the application identifier data includes at least one piece of information selected from the group consisting of: application name, application version, and application vendor.

In still another embodiment, the application identifier is also associated with one or more product identifiers that indicate execution platforms with which the application is compatible.

In a yet further embodiment, the memory is also configured to store information describing the compatibility and interoperability of software modules using application identifiers.

In yet another embodiment, the software modules include shared libraries.

In a further embodiment again, certifying an application for a consumer electronics product includes receiving application identifier data, storing an application identifier on a server so that the application identifier data is associated with the application identifier and application, storing the application identifier on a device, extracting the application identifier from communications sent from the device, retrieving application identifier data associated with the application identifier, and displaying the application identifier and application identifier data in human-readable format.

Another embodiment again also includes receiving one or more product identifiers, where each product identifier is associated with an execution platform, validating the application associated with the application identifier on a device including the execution platform identified by the product identifier, and storing an association between the one or more product identifiers and the application identifier on the server.

BRIEF DESCRIPTION OF THE DRAWINGS

FIG. 3 conceptually illustrates a relational database, including tables maintained by an authentication server in accordance with an embodiment of the invention.

DETAILED DISCLOSURE OF THE INVENTION

Figure 1:
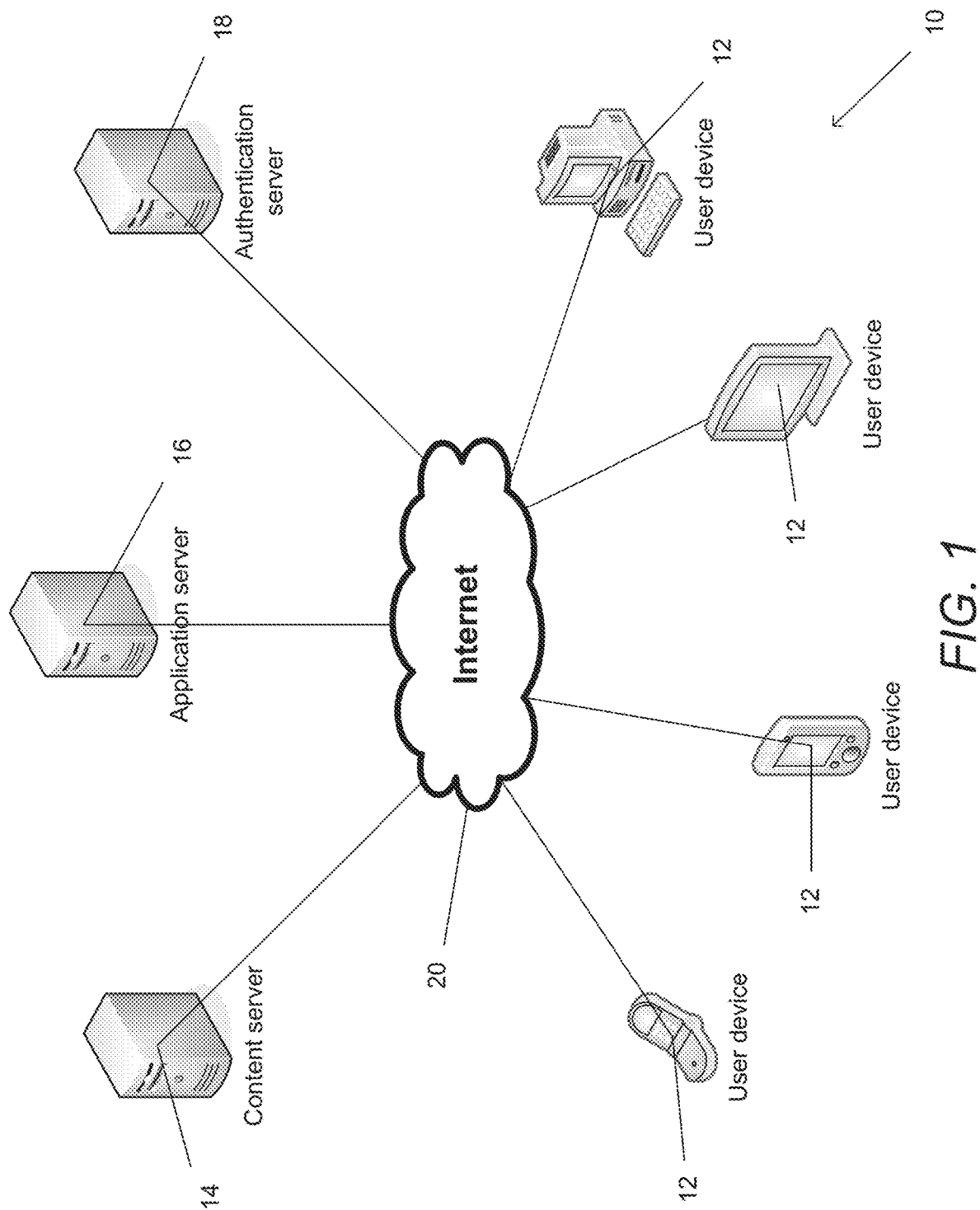
FIG. 1 is a system-level overview illustrating a DRM and content distribution system in accordance with an embodiment of the invention.

Turning now to the drawings, systems and methods for application identification in accordance with embodiments of the invention are illustrated. Common application platforms, including the common application platforms described in U.S. patent application Ser. No. 13/223,053, filed Aug. 31, 2011, entitled "Systems and Methods for Common Application Platforms Utilizing Shared Libraries", enable the development of applications that can execute on different hardware and operating system combinations. In many instances, the common application platforms include shared libraries that can be utilized by an application to efficiently perform specific functions on a specific device. The shared libraries can provide a variety of functions including (but not limited to) media playback and handling of digital rights management (DRM). The disclosure of U.S. patent application Ser. No. 13/223,053 is incorporated by reference herein in its entirety.

When users are able to load applications onto user devices that are configured using common application platforms, the potential exists for the user to load an application that is not compatible with the specific hardware capabilities of the user device and/or the specific versions of the shared libraries present on the user device. In a number of embodiments, applications authorized to run on a common application platform include an application identifier (application ID) that enables an authentication server to authenticate the application. When an application is authenticated by the authentication server, the user device can grant the application access to the shared libraries and/or other resources within the common application platform.

In many embodiments, the user device includes a product identifier (product ID) such as (but not limited to) the product identifiers described in U.S. Patent Application Ser. No. 61/581,598. As part of the process of authenticating an application, the user device can provide its product ID to the authentication server with the application's application ID and the authentication server can determine whether the application identified by the application ID is capable of executing on the product identified by the product ID. The disclosure of U.S. Patent Application Ser. No. 61/581,598 is incorporated by reference herein in its entirety.

In several embodiments, aspects of the common application platform including (but not limited to) one or more of the shared libraries within the common application platform include application IDs. When the user device authenticates an application, the user device can provide the application IDs of one or more of the shared libraries to the authentication server and the authentication server can determine whether the application identified by an application ID is compatible with the shared libraries identified by the shared library application IDs.

Shared libraries on common application platforms can be subject to a number of other attempts to acquire valuable information including (but not limited to) cryptographic keys and user information (often referred to as attacks). One such attempt involves loading modified or untrusted applications onto the common application platform in an attempt to intercept valuable information. In many embodiments, the application ID is contained within encrypted provisioning data embedded within or accompanying the application and a user device can authenticate the application by providing the encrypted provisioning data to a remote authentication server along with information describing one or more characteristics of the application including but not limited to hashes or checksums of one or more files that make up the application. In this way, the authentication server can detect attempts to modify or tamper with the application. When the characteristics of the application do not match the application characteristics associated with the application ID, then the authentication server can notify the common application platform and access to the shared libraries is denied. Another attack is to wrap an untrusted application around a library such that it can intercept communication between a trusted application and the shared library. Such an attack can be prevented by enabling an application communicating with the shared library to verify that it is communicating with a trusted library.

In a number of embodiments, a static library (session manager) is compiled into an application and the common application platform includes a manifest describing the shared libraries on the common application platform. The application can use the session manager and the manifest to authenticate the shared libraries with which it communicates. In several embodiments, the manifest contains descriptions of the shared libraries including (but not limited to) hashes or checksums of the shared library modules. In the event that the session manager detects a shared library that is not trusted, the application can cease communication with the shared library. In some embodiments, the session manager is part of the common application platform instead of the application, but can still be utilized by the application in the same ways.

In many embodiments, the application ID or the application ID in conjunction with the application version can be used to revoke or force an upgrade of all application software deployments or, in conjunction with the product ID, can be used to revoke or force an upgrade of application software on a subset of the platforms which the application is deployed to.

System Architecture

A system including user devices running common application platforms in accordance with an embodiment of the invention is illustrated in FIG. 1. The system 10 includes a number of different types of user device 12 that each runs a common application platform. In many embodiments, each of the various user devices 12 include applications running on common application platforms utilizing natively implemented shred libraries, and the user devices are connected to a content server 14, application server 16 and authentication server 18 over the Internet. In several embodiments, the common application platform enables non-natively implemented applications to execute on each of the user devices. The user devices 12 communicate with a content server 14, application server 16 and authentication server 18 over a network such as the Internet 20. In several embodiments, the content server 14 is a server that can deliver content to the user devices 12. In many embodiments, the content can be downloaded and/or streamed by the user devices 12. In a number of embodiments, application servers 16 store applications that can be downloaded and installed on user devices 12. Authentication servers 18 can be used to authenticate applications using an application ID provisioned to the application and to confirm that the application is compatible with a specific user device using a product ID provisioned to the user device and/or application IDs provisioned to shared libraries within the common application platform on the user device 12.

In various embodiments, the shared libraries on the common application platform can be utilized by applications running on the common application platform. The inclusion of natively implemented libraries that can be shared among applications can increase the functionality of the applications that can be implemented on the common application platform. By way of example, an application running with an application platform on a user device 12 can utilize a natively implemented media playback library and a DRM library to stream protected content from the remote content server 14 via the Internet 20. These same libraries can be utilized by other applications.

Although a specific architecture is shown in FIG. 1 any of a variety of architectures can be utilized that enable applications on user devices to securely access shared libraries in accordance with embodiments of the invention. Application IDs and the authentication of applications and shared libraries in accordance with embodiments of the invention are discussed further below.

Application Identifier

In many embodiments of the invention, an application ID is a unique character string that is associated with a set of application identifier data, where a set of application identifier data is descriptive of an application. Any of a number of methods can be used to generate an application ID, including a random number generator, manual numbering or determination by a person, or systematic methods such as using sequential numbers. Typically, an authentication server receives application identifier data, generates an application ID, and associates the application identifier data with the application ID in a database.

Application identifier data that is associated with each application ID can include (but is not limited to): application name, application version, and application vendor or developer. The individual pieces of application identifier data represent information about an aspect of an application that remains static throughout all instances where the application is deployed. Information may also be included that can be used to verify some or all of the files of the application such as a checksum or hash of part or all of a file. As discussed below, the information can be used to verify that the files deployed with an application on a device are identical to the files that were originally submitted for certification and issuance of the application ID, i.e., that they were not tampered with, altered, or an unauthorized version of the application.

In some embodiments of the invention, the application ID remains constant across different versions of the application. The application version is then not included as application identifier data but is stored along with the application ID on devices as further identifying information.

As is described below, product IDs may also be associated with an application ID by the authentication server to indicate what products or execution platforms have been tested to be compatible with the application. An execution platform can be a particular hardware configuration or chipset and firmware combination utilized by a user device. Systems and methods for identifying consumer electronic products using product IDs include those disclosed in U.S. Patent Application Ser. No. 61/581,598 entitled "Systems and Methods for Identifying Consumer electronic Products Using a Playback Device with a Product Identifier," incorporated by reference above.

In many embodiments, an application is configured to execute on a common application platform deployed to a specific product. Common application platforms such as (but not limited to) the common application platforms described in U.S. patent application Ser. No. 13/223,053, filed Aug. 31, 2011, entitled "Systems and Methods for Common Application Platforms Utilizing Shared Libraries", can include shared libraries that can be utilized by applications. In several embodiments of the invention, various software components such as shared libraries can also be issued application IDs. As will be discussed further below, the use of application IDs on multiple software components can provide additional authentication of the components and an ability to verify compatibility. An authentication server can associate the application ID of an application with the application IDs of the shared libraries that have been tested as compatible with the application. When a number of software components are interacting, application IDs for the combination can be sent to a server that has information to authenticate and determine the interoperability of the components. In this way, a user device can verify that an application is compatible with the shared libraries currently stored on the user device. As is discussed further below, an authentication server can force updates to the application and/or shared libraries in response to incompatibilities that can be corrected via appropriate updates.

In several embodiments of the invention, an application vendor requests that an application be certified (i.e., tested and issued an application ID) and provides application identifier data, as well as product IDs for the execution platforms for which the application should be certified. The distributor of the common application platform certifies the application by verifying that the application can execute on a common application platform installed on a device that is exemplary of the product identified by the product ID. The product IDs of the execution platforms for which the application is certified and the application identifier data are associated with the application ID in a database maintained by an authentication server system. Generally, a change in the value of any piece of application identifier data will necessitate a different application ID.

Because the application ID is used as an authentication mechanism, it is desirable that the user device by prevented from accessing the application ID. The application ID can be obfuscated in a variety of ways including (but not limited to) being encoded, encrypted, or compiled into a binary in a way that additional information is required in order to interpret the application ID. In several embodiments of the invention, the application ID is contained in encrypted provisioning data that is embedded within an application. The application ID can only be accessed using cryptographic information associated with the application ID known to the authentication server.

Although specific application identifier data and fields are described above, systems and methods in accordance with embodiments of the invention can utilize any of a variety of types of information to identify an application and associate the information with an application ID. Furthermore, the pieces of information included in application identifier data associated with an application ID can be defined by an application ID version.

Provisioning Data

In many embodiments of the invention, encrypted provisioning data containing an application ID is issued for each software module (application, library, etc.). The encrypted provisioning data is stored along with the module when the module is deployed on a user device. The provisioning data typically contains at least the application ID or information from which an application ID can be determined.

In many embodiments, the provisioning data includes the application name and an application ID associated with the application. Other embodiments may also include the application version. As indicated above, in some embodiments the same application ID is maintained among different versions of the application. Including the application version in the provisioning data can serve to further identify the application. On a user device that has multiple client applications and libraries, each application and library may be issued encrypted provisioning data.

As discussed above, the application ID should not be easily discernible. In many embodiments, the provisioning data is encrypted so that only a server with cryptographic information associated with the application ID can access its contents. Some embodiments may maintain confidentiality by communicated the provisioning data or application ID only over a secure connection such as secure sockets layer (SSL).

The provisioning data can be issued during a certification process as will be discussed further below.

Shared Libraries and Library Manifest

Shared libraries are software modules that contain sets of related software instructions that can be utilized by applications. The libraries can be designed to be accessed by other software components such as by an application programming interface (API). In many embodiments, shared libraries are included in a common application platform. In other embodiments, shared libraries are built by a vendor and included in basic device firmware.

In a number of embodiments, a library manifest is utilized to enable authentication of shared libraries. In several embodiments of the invention, a library manifest contains private key signatures or hashes of each shared library and information to identify each library such as a name or numerical identifier.

A cryptographic hash function is a procedure or algorithm that takes an arbitrary block of data and returns a fixed-size bit string, the hash value, such that an accidental or intentional change to the data will change the hash value. A cryptographic hash function ideally has four significant properties: it is easy to compute the hash value for a given input value, it is infeasible to generate an input value that has a given hash value, it is infeasible to modify an input value without changing the resulting hash value, and it is infeasible to find two input values with the same hash value.

The library manifest can be made more tamper-resistant by signing and encrypting its contents. A private key signature of the payload of the manifest can be made and included, and the payload can be encrypted with a manifest key. In many embodiments of the invention, a static session manager is included in each application, which has the manifest key and public key can and can utilize the library manifest to authenticate shared libraries.

The session manager is compiled statically and incorporated into each application that accesses a shared library secured by a manifest. In several embodiments of the invention, other modules that contain sensitive information susceptible to a security breach or that perform sensitive data manipulations, such as a DRM library or a playback library, can be compiled statically into an application. When a library is statically compiled into an application, the static library is not available for use through an API, and is therefore not considered a shared library. Session managers in accordance with embodiments of the invention are discussed further below.

Session Manager and Session Token

In several embodiments of the invention, a session manager provides an interface to an application to request access to a shared library's entry point. The session manager is a static library that is typically developed by the common application platform provider. The session manager can be integrated into an application by its developers to enable access to the relevant shared libraries. Alternatively, the session library can be integrated into the common application platform and accessed by the application.

One method of regulating access is for the session manager to provide a token to the client application. Tokens can be used as a credential to permit an authorized session between software modules such as to provide rights to a client application to access a shared library. The session token may contain a creation time that can be used to validate the token, a validity duration for the amount of time before the token expires, the name of the requesting application, and/or other information that would be useful in securing a session or indicating what privileges the application is allowed.

In several embodiments of the invention, when an application requests access to a shared library, a session manager negotiates a session token key with the target shared library and issues an encrypted session token to the client application giving the application rights to access the library. As will be discussed further below, any of a variety of methods can be used to negotiate a session token key so long as a trust relationship can be established between a session manager and target library. The process can include other verification steps such as checking the hash values of libraries against the library manifest.

Application Identifiers and User Devices

Figure 2:
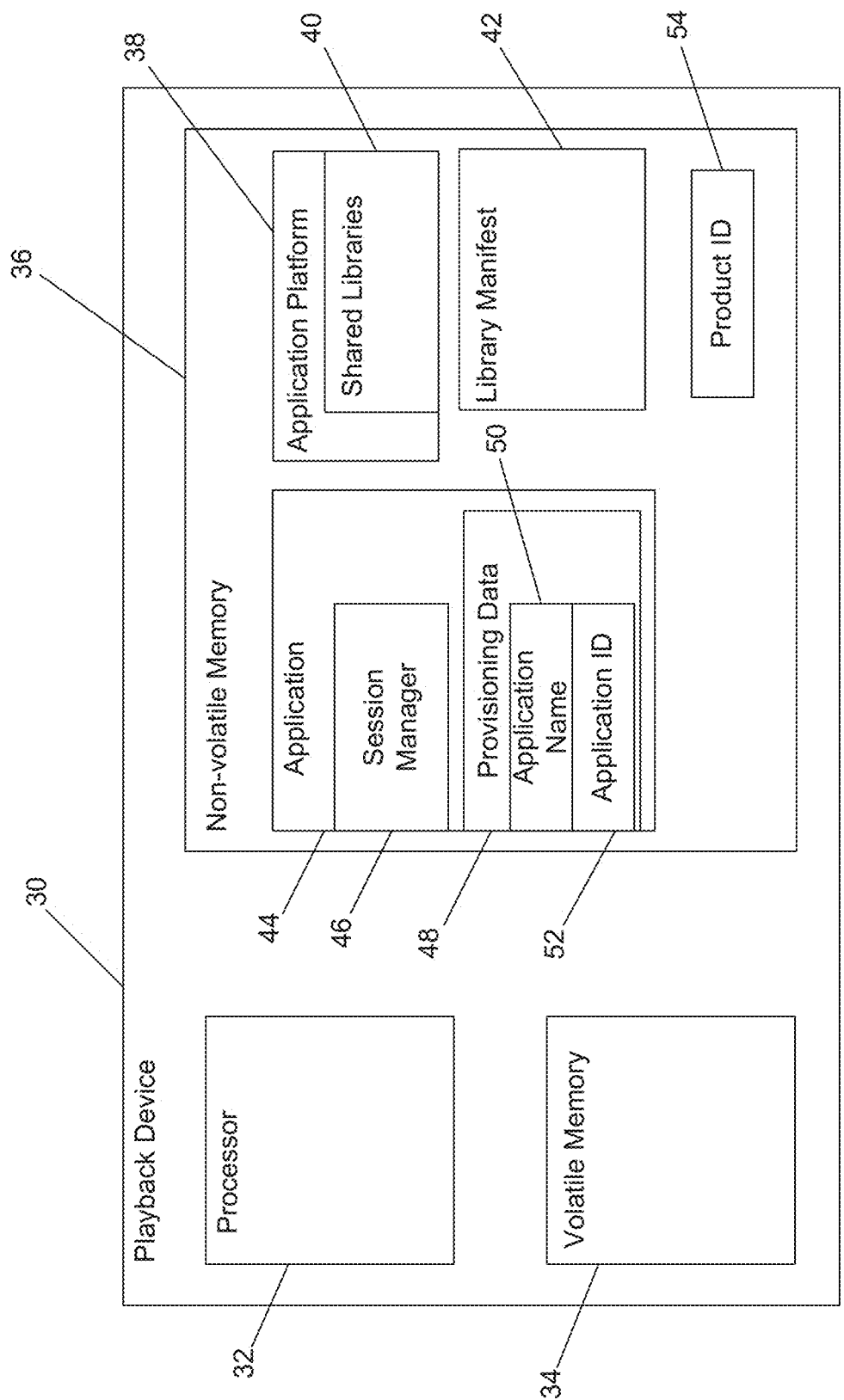
FIG. 2 conceptually illustrates a playback device, which stores an application including an application ID that executes on a common application platform utilizing shared libraries in accordance with an embodiment of the invention.

In many embodiments, an application stored on a user device includes an application ID that is not accessible to the user device. A user device, which stores an application including an application ID that executes on a common application platform utilizing shared libraries in accordance with an embodiment of the invention is shown in FIG. 2. The user device 30 includes a processor 32, volatile memory 34, and non-volatile memory 36. In the illustrated embodiment, the non-volatile memory 36 includes executable instructions that implement a common application platform 38 including one or more shared libraries 40. A library manifest 42 is also provided that can be utilized in the authentication of the shared libraries 40. The non-volatile memory 36 also includes an application 44 configured to execute on the common application platform 38. The application 44 includes a session manager 46 and encrypted provisioning data 48. As discussed above, the session manager 46 is a library statically compiled into the application that enables authentication of the shared libraries 40 and the encrypted provisioning data 48 can be utilized to authenticate the application 44.

In several embodiments, an application name 50 and application ID 52 are contained within the encrypted provisioning data 48 along with an application version. Embodiments of the invention, however, are not limited to storing the application ID and associated data within the encrypted provisioning data. In many embodiments, the provisioning data 48 is encrypted using a provisioning data key. The encrypted provisioning data 48 can be stored in a variety of ways including being embedded within the application 44, stored separately or stored within other files or modules on the device. The encrypted provisioning data 48 can be utilized to authenticate the application 44. In addition, the combination of the encrypted provisioning data 44 and the library manifest 42 can be utilized to determine the compatibility of the application 44 with the shared libraries 40 present on the user device 30.

The non-volatile memory 36 of the user device 30 also includes a product ID 54, which can be utilized for a variety of purposes including determining the compatibility of the application 44 with the user device 40. Although a specific user device architecture and set of data and applications are illustrated in FIG. 2, any of a variety of architectures can be utilized that enable the execution of applications identified using an application ID in accordance with embodiments of the invention. The manner in which application IDs can be utilized to authenticate and verify the compatibility of an application with a user device and a set of shared libraries in accordance with embodiments of the invention are discussed further below.

Associating Application IDs with Specific Applications

An authentication server configured to communicate with user devices typically performs application authentication and application compatibility using application IDs and product IDs. The authentication server can maintain a database that associates a specific application ID with application data. In addition, the database can associate an application ID with other application IDs and/or product IDs with which the application is compatible (e.g. the application has been certified with respect to specific products and shared libraries). A relational database, conceptually illustrating tables in a database maintained by an authentication server in accordance with an embodiment of the invention is shown in FIG. 3. The relational database 70 contains at least one application data table 72. The application data table 72 holds values for application ID, application name, application version, vendor, and product ID. An application ID can be associated with more than one product ID, where an application is compatible with multiple execution platforms. In addition, an application ID can be associated with more than one application ID to indicate shared libraries and/or other resources with which the application is compatible. Although specific data structures and data fields/dimensions are illustrated in FIG. 3 any of a variety of data structures can be utilized to store data associated with application IDS such as (but not limited to) lists in accordance with embodiments of the invention.

Certification of Compatibility with Specific Devices

In many embodiments of the invention, application IDs are assigned to applications during a certification process that determines that an application functions properly on specific products or types of device and/or with specific shared libraries. As discussed above, products or execution platforms can be identified using product IDs and shared libraries can be identified using their own application IDs. Once compatibility is verified, then an authentication server can assign an application ID to the application and associate the assigned application ID with product IDs and application IDs of compatible products and shared libraries. In embodiments where the application is unable to access the application ID, the application ID and any associated data can be encrypted using any of a variety of cryptographic techniques to create encrypted provisioning data that can be embedded within the application or provided accompanying the application to enable authentication of the application by the authentication server.

Figure 4:
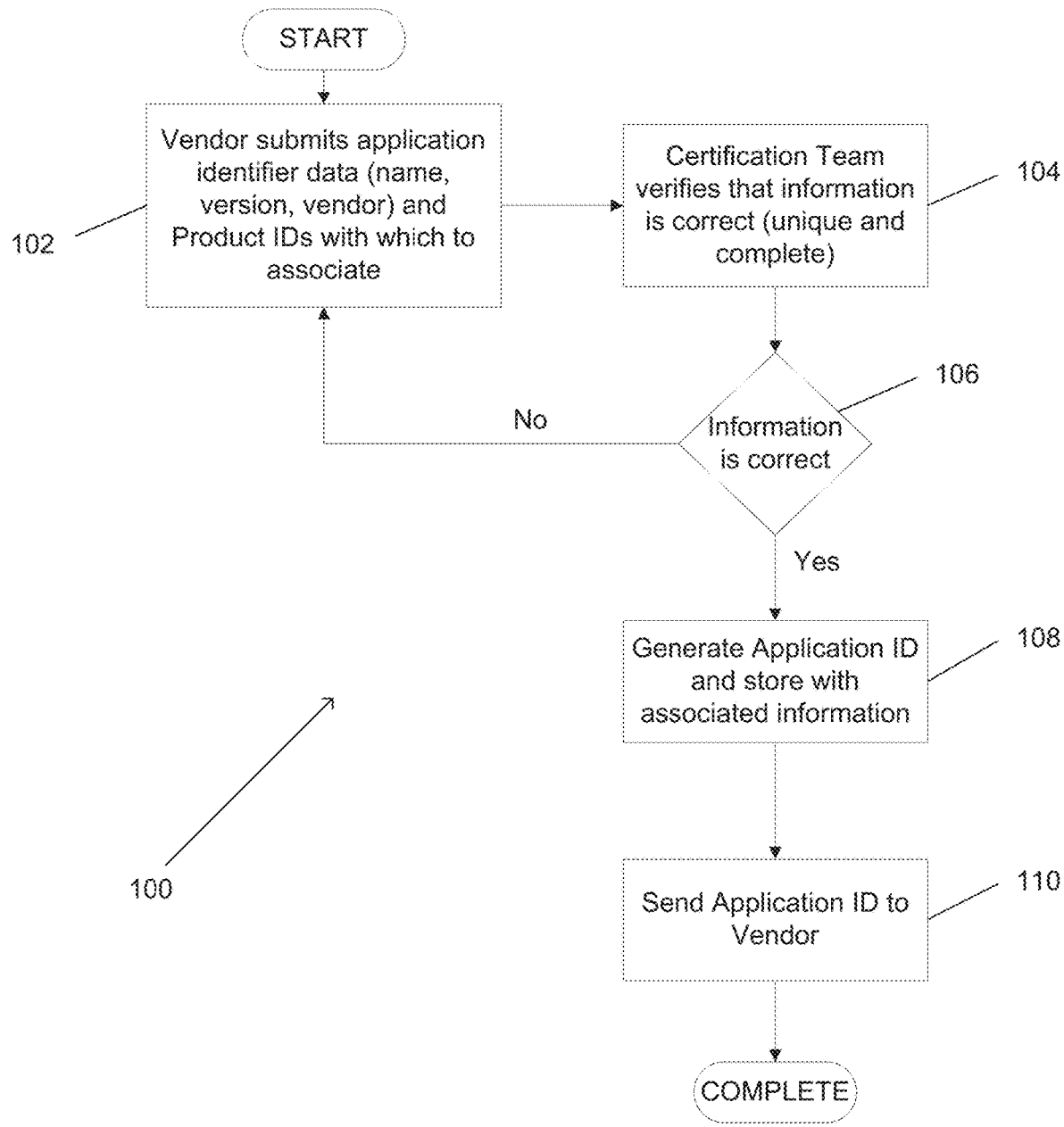
FIG. 4 is a flow chart illustrating a process for issuing an application ID during a certification process, in accordance with an embodiment of the invention.

A process for issuing an application ID during a certification process, in accordance with an embodiment of the invention is shown in FIG. 4. During the process 100, an application developer submits (102) application identifier data. In a number of embodiments, the application identifier data can include (but is not limited to) an application name, application version, and vendor, to a certification team. The submission may also include product IDs that indicate the products or execution platforms for which the application is intended and that the application should be tested on for certification. The submission can be a paper form that is filled out with the relevant application identifier data, an electronic form that transmits the information over a network, or other manual or automated process. The certification team verifies (104) that the information is correct—that it is unique (i.e., data that should be unique to an application do not have the same values as data in another application) and complete (i.e., data is not missing). If the information is correct (106), the certification team generates (108) an application ID. The newly created application ID is associated with the application identifier data and platform IDs by the authentication server and stored for retrieval (e.g. using a database similar to the database depicted in FIG. 3). Some embodiments of the invention may store hash values of the information to allow for more efficient communication when the data needs to be transmitted. The application ID is sent (110) to the vendor to be stored on each device on which the application is deployed. In some embodiments of the invention, the application ID and application name are encrypted to generate encrypted provisioning data. In several embodiments, the encryption is performed using a provisioning data key that is not known to the application developer. The provisioning data key is stored on the server or other secure system so that it can be utilized to verify and/or interpret provisioning data received from user devices.

Although a specific process is illustrated in FIG. 4, any of a variety of processes for generating application IDs and embedding the application IDs into applications can be utilized in accordance with embodiments of the invention. Once the application ID is embedded within the application, the application can be certified on a variety of different products on which different shared libraries may be installed. Processes for certifying that an application is compatible with a specific product and/or set of shared libraries in accordance with embodiments of the invention are discussed below.

Certifying an Application and Assigning an Application ID

Figure 5:
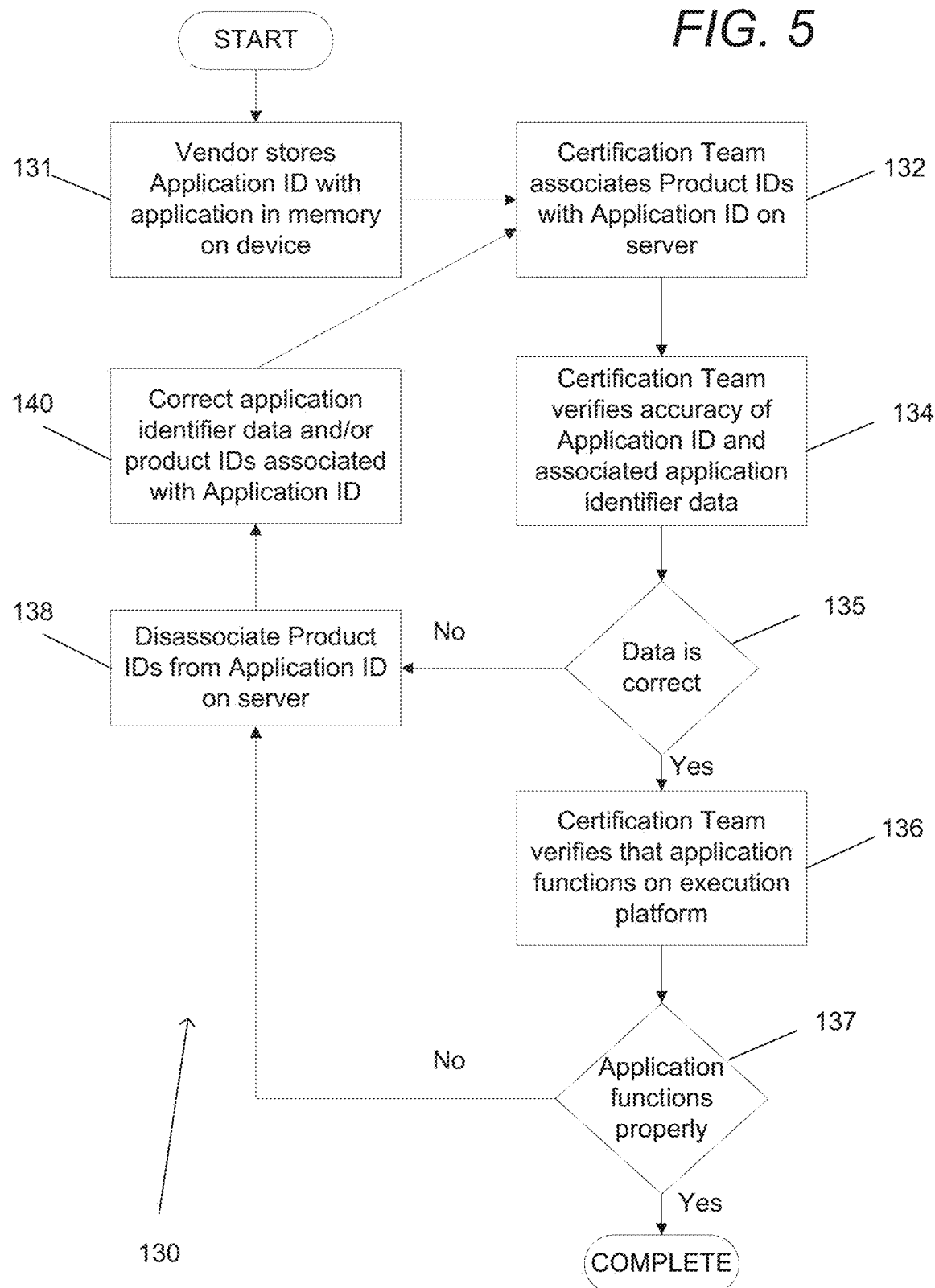
FIG. 5 is a flow chart illustrating a certification process for verifying that an application is compatible with a specific product identified using a product ID, in accordance with an embodiment of the invention.

A certification process 130 for verifying that an application is compatible with a specific product identified using a product ID in accordance with an embodiment of the invention is shown in FIG. 5. As noted above, an application can be identified by storing (131) an application ID within or accompanying the application. In some embodiments of the invention, the application ID and application name can be contained within a provisioning data packaged to be loaded on the device. The certification process itself involves an authentication server associating (132) the product IDs with which the application is believed to be compatible. The certification team verifies (134) that the application ID is stored accurately and that the associated application identifier data stored on the server accurately describes the application (i.e. the application's characteristics have not changed since the application ID was issued to the application developer). A variety of methods can be utilized to complete the verification. In many embodiments of the invention, the application ID is not viewable or obtainable by the application (or the user device) as discussed above. In some embodiments, the application ID is contained in encrypted provisioning data. When the application ID is not directly obtainable from the device or software, it may be extracted from device-initiated communications with an authentication server. A gateway placed between the device and the authentication server can extract the application ID or provisioning data before sending the provisioning data to the authentication server, and request the application identifier data that is associated with the application ID from the server. The gateway can display the application identifier and/or application identifier data to the certification team for verification that it is accurate for the tested application.

The certification team verifies (136) that the application functions properly, as expected, and as intended on the execution platforms for which the application is to be certified. Testing of the application can include stability, speed, and other technical criteria that may be platform or user experience dependent. Specific technical criteria may vary and may be determined by the certification team. If the application is validated (137) for the execution platforms, then testing is complete.

If certification fails at verifying (134) the application ID and associated data or validating (136) the application on the intended execution platforms, the associated product IDs are disassociated (138) from the application ID on the server (or never associated in the first place). Application identifier data is corrected (140), product IDs for incompatible execution platforms are removed, or any technical issues are resolved. Testing can then recommence by associating (132) product IDs with the application IDs on the server.

Associating product IDs with an application ID provides a list of product IDs for which the application has been validated. The list can be updated with new product IDs when an application developer requests to deploy the application to additional execution platforms.

Although a specific process is illustrated in FIG. 5, any of a variety of processes for certifying that an application is compatible with specific execution platforms can be utilized in accordance with embodiments of the invention. Although the process described with respect to FIG. 5 mainly discusses certification in the content of execution platforms, certification can also be performed with respect to specific versions of shared libraries. When an application can be certified with respect to specific shared libraries, the shared libraries can also be identified using application IDs. The application IDs of the shared libraries for which the application is compatible can be associated with the application ID of the application in the database of an authentication server in a similar manner to that in which product IDs are associated with the application ID of the application.

Authenticating an Application

Once an application is deployed including an embedded or associated application ID, the application ID can be used to authenticate the application and to verify the compatibility of the application with a specific user device and/or shared libraries found on the user device and/or to verify that the application is permitted to perform specific functions on a user device. When the application is executed on a user device, requests sensitive information, and/or attempts to perform a restricted function, the user device can provide the application ID of the application and data describing the application to an authentication server to authenticate the application. In addition to authenticating the application, the authentication server can verify the functions that are permitted with respect to the application, the compatibility of the application with the user device and shared libraries on the user device, and can determine whether the application (or the shared libraries) require updates.

Figure 6:
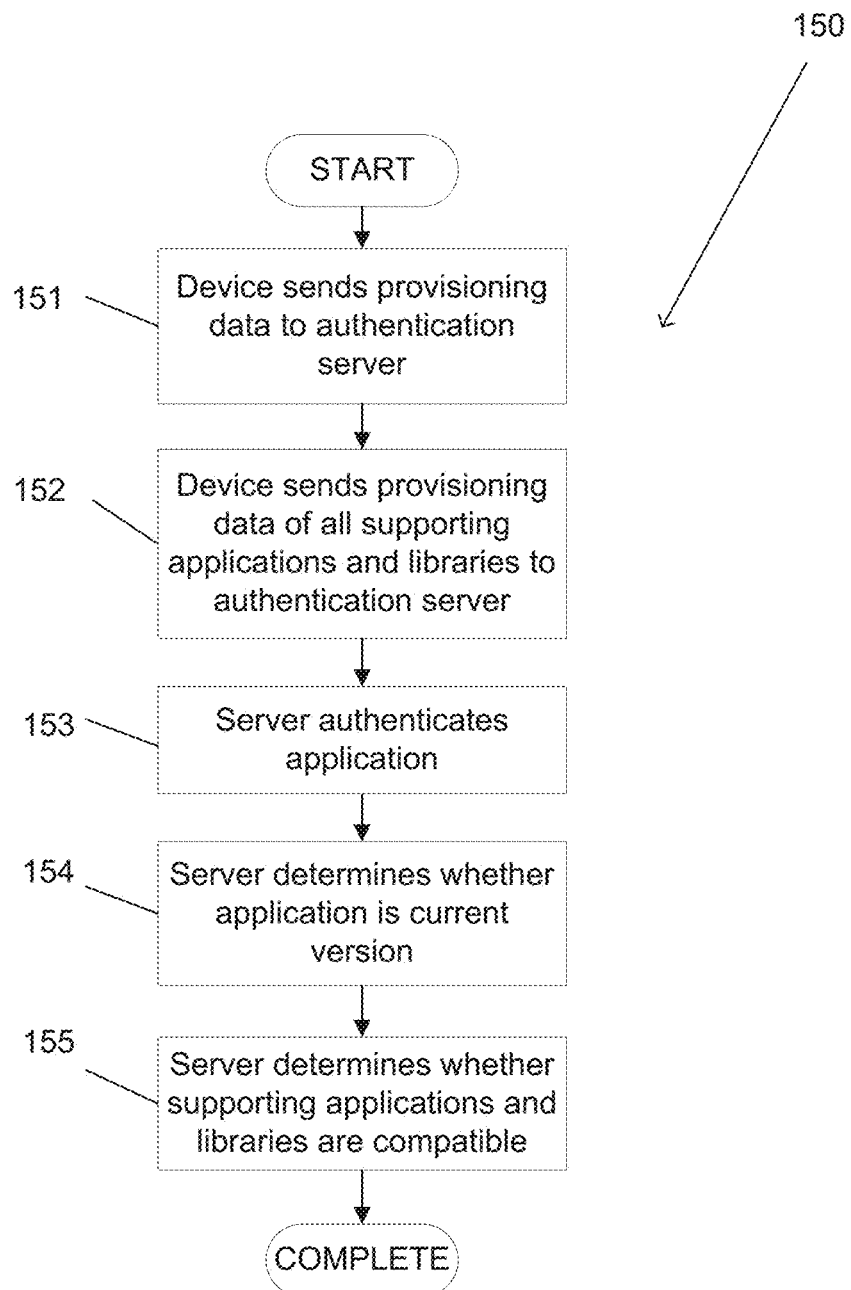
FIG. 6 is a flow chart illustrating a process for authenticating an application installed on a user device using an application ID, in accordance with an embodiment of the invention.

A process for authenticating an application installed on a user device using an application ID in accordance with an embodiment of the invention is shown in FIG. 6. In the process 150, a device sends (151) provisioning data, which contains at least an application ID, to an authentication server. In many embodiments of the invention, other applications and libraries may be involved to support the application that initiated the communication, and the supporting applications and libraries may have their own provisioning data and/or application IDs. The device can send (152) the application IDs or provisioning data of the supporting applications and libraries to the server to determine compatibility with the application. In some embodiments, an application version is also sent, either contained within the provisioning data or separately. When the provisioning data is encrypted, the server will typically have the cryptographic data associated with the application ID to decrypt the provisioning data received from the user device and extract the application ID within.

The authentication server can authenticate (153) the application using the application ID. In many embodiments, the user device provides information describing the application to the authentication server in conjunction with the application ID and the authentication server can match the description and the application ID against stored information using an authentication application. In many embodiments, the description includes (but is not limited to) a checksum, a cryptographic hash and/or any other piece of information derived from one or more files that make up the application. The authentication server can also determine whether the application is permitted to execute a specific function. For example, a video playback application may be limited to certain formats or certain resolutions, and the server can deny requests for content that does not conform.

The server determines (154) whether the application is the current version. As indicated above, the application version can be used in a variety of ways, including being contained in the provisioning data or being associated with an application ID. Thus, an outdated instance of an application can be detected by extracting the version from the provisioning data, or by its application ID when the version is associated with the application ID. If the application is not the current version or within a range of versions, the server can force an upgrade of the application and/or deny attempted functions until an upgrade is applied.

The server can determine (155) whether supporting applications and libraries are compatible. The server may store tables or lists that describe compatibility and interoperability of client applications, supporting applications, and libraries. If the combination that was sent (152) to the server does not match a combination that is listed as compatible or permitted, the server can deny the application from proceeding. While the process illustrated in FIG. 6 utilizes provisioning data containing application IDs to identify applications, other methods of utilizing application IDs can be used such as taking a hash or signature of the provisioning data or application ID and sending the value to the server, which has stored a predetermined value for the hash or signature in accordance with embodiments of the invention.

Verifying Shared Libraries

An application ID enables authentication of applications executing on a common application platform, however, the potential exists for a shared library to be compromised by way of any number of different types of attacks. In a number of embodiments, user devices not only authenticate applications, but also permit applications to authenticate the share libraries installed on the device. In several embodiments, a session manager is compiled into the application to provide the application with the ability to authenticate shared libraries. In addition, the session manager can provide an interface to request access to a shared library's entry point. The session manager can regulate access to a shared library by issuing a session token to the application after certain conditions are met. Conditions can include verifying the application's application ID and the target library's signature in the library manifest. This provides assurance that each software component is authentic and identified.

Figure 7:
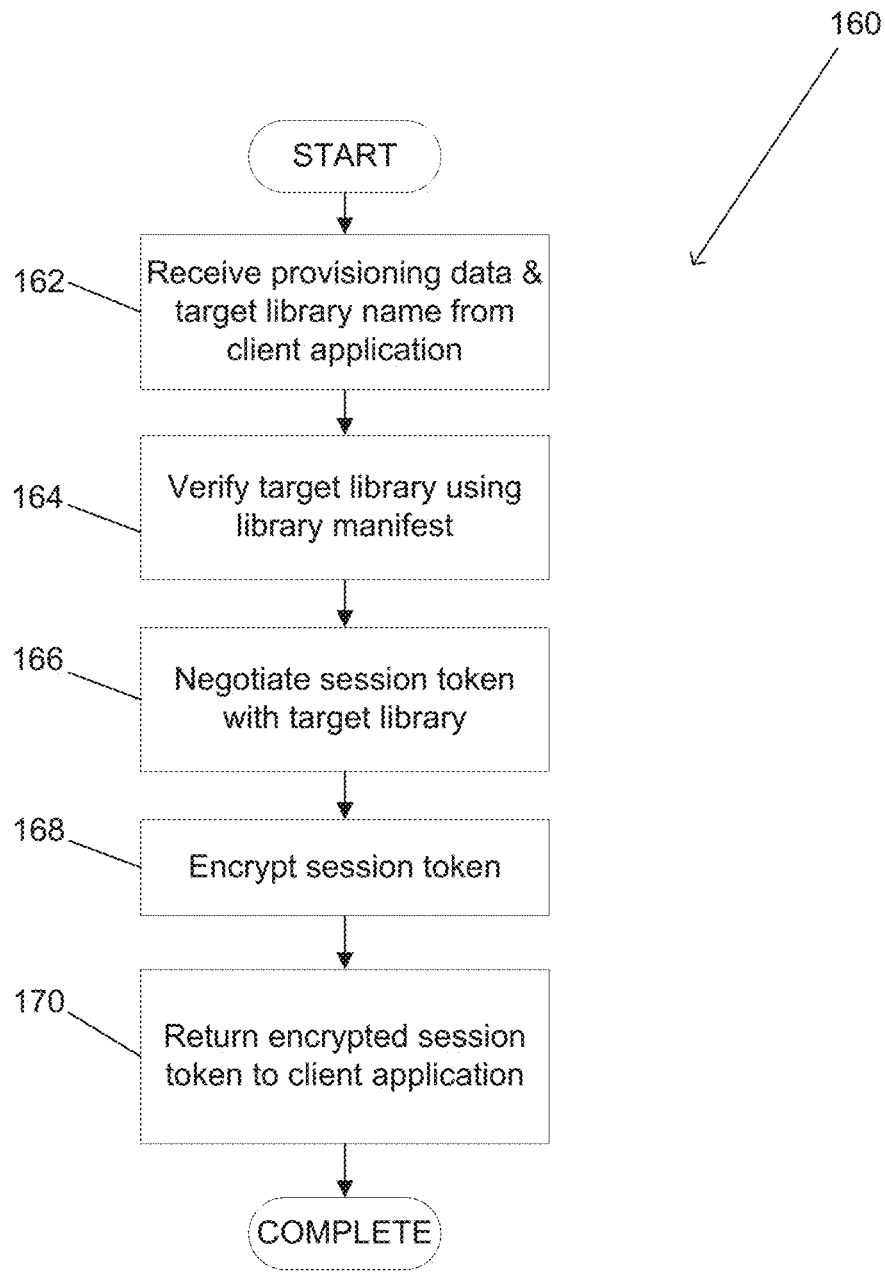
FIG. 7 is a flow chart illustrating a process for authenticating and providing access to a shared library via a session manager, in accordance with an embodiment of the invention.

A process for authenticating and providing access to a shared library via a session manager in accordance with an embodiment of the invention is shown in FIG. 7. The process 160 commences when a session manager receives (162) a request from an application to access a target library. The session manager verifies (164) the target library using the library manifest. As discussed above, the library manifest can contain a hash, signature, or other information that can be used to reliably identify shared libraries on a user device. In some embodiments of the invention, the manifest may be encrypted with a symmetric manifest key and signed with an asymmetric private key. The session manager can use the manifest key to decrypt the manifest and corresponding asymmetric public key to validate the signature of the manifest. The session manager can take a hash or signature of the target library and compare the value against the manifest in order to verify the library. In other embodiments, any of a variety of cryptographic techniques can be utilized to secure the manifest in such a way that it can be accessed by a session manager.

In several embodiments of the invention, when an application authenticates a target shared library, a session manager negotiates (166) a session token key with the target shared library and issues an encrypted session token to the client application giving the application rights to access the library. Any of a variety of methods can be used to negotiate a session token key so long as a trust relationship can be established between a session manager and target library, including (but not limited to) public key-private key encryption. A session manager can exchange information by a first handshake and second handshake with a target library, preferably over a secure connection such as one established by Secure Sockets Layer (SSL). In a first handshake, the session manager sends a request and the library returns some data encrypted with the session manager's public key. In the second handshake, the session manager sends the decrypted data or some information indicative of the data that is reencrypted with the library's public key. The library returns a confirmation if it is able to recover the data payload. The data used in the handshake or some other predetermined data can then be used by the session manager and the library to generate a shared session token key, which is used to encrypt (168) the session token. The token is returned (170) to the client application to be used in accessing the shared library it had requested.

Although a specific process is illustrated in FIG. 7, any of a variety of processes for providing an application with access to a shared library can be utilized in accordance with embodiments of the invention.

Although the description above contains many specific details, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for requesting and playing back video media content, the method comprising:
    communicating communication data comprising an application identifier to a playback device, where the application identifier is a unique character string that identifies a video playback application on the playback device and remains static throughout all instances where the application is deployed;
    where the playback device stores a plurality of client applications, and each client application has an associated application name, application version, and application identifier;
    starting a client application, of the plurality of client applications, that is identified by the application identifier received within the communication data by the playback device;
    requesting and receiving portions of video content from a content server by the playback device as instructed by the identified client application; and
    playing back the received portions of video content by the playback device.

2. The method of claim 1, further comprising:
    retrieving a product identifier stored in a memory of the user device, where the product identifier is associated with the execution platform of the user device.

3. The method of claim 1, further comprising:
    receiving a request for access to a shared library on the playback device;
    verifying the shared library on the playback device using a library manifest containing information that can be used to identify and verify the shared library, wherein the library manifest contains at least one hash value of the shared library, and wherein verifying the shared library comprises taking a hash value of the shared library and comparing the hash value against the at least one hash value contained in the manifest;

negotiating a session token key with the shared library using the playback device; and providing a session token encrypted with the session token key to the application using the user device, wherein the session token key grants access to the shared library.

4. The method of claim 3, wherein the library manifest contains at least one private key signature.

5. The method of claim 3, wherein the library manifest contains a private key signature of the contents of the manifest.

6. The method of claim 3, wherein negotiating a session token key comprises:

sending a request to the shared library using the playback device;

receiving data encrypted with a session manager's public key using the user device;

sending data encrypted with the shared library's public key to the shared library using the user device; and receiving confirmation from the shared library using the user device.

7. The method of claim 6, further comprising retrieving a product identifier stored in a memory of the user device, where the product identifier is associated with the execution platform of the user device.

8. The method of claim 1, wherein a session manager is statically compiled into the application.

9. The method of claim 1, wherein a session manager and shared libraries are part of a common application platform stored in a memory of the user device.

10. The method of claim 1, further comprising determining whether a software library is compatible with a particular application using an application identifier of the application.

11. The method of claim 1, wherein the communication data is communicated over a secure connection using secure sockets layer (SSL).

12. The method of claim 1, wherein playing back the received portions of video content by the user device further comprises authenticating a shared library using a library manifest.

* * * * *